United States Patent
Zhang et al.

(10) Patent No.: US 11,343,800 B2
(45) Date of Patent: May 24, 2022

(54) CONTROL CHANNEL RESOURCE INDICATION METHOD, USER EQUIPMENT, AND NETWORK DEVICE

(71) Applicant: HUAWEI TECHNOLOGIES CO., LTD., Guangdong (CN)

(72) Inventors: Xu Zhang, Beijing (CN); Lixia Xue, Beijing (CN); Bingyu Qu, Beijing (CN); Junchao Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 48 days.

(21) Appl. No.: 16/456,935

(22) Filed: Jun. 28, 2019

(65) Prior Publication Data

US 2019/0320428 A1 Oct. 17, 2019

Related U.S. Application Data

(63) Continuation of application No. PCT/CN2017/120221, filed on Dec. 29, 2017.

(30) Foreign Application Priority Data

Dec. 30, 2016 (CN) .......................... 201611263794.6

(51) Int. Cl.
*H04W 72/04* (2009.01)
(52) U.S. Cl.
CPC ..... *H04W 72/0406* (2013.01); *H04W 72/044* (2013.01)
(58) Field of Classification Search
CPC .... H04L 5/0053; H04W 72/04; H04W 72/042
See application file for complete search history.

(56) References Cited

U.S. PATENT DOCUMENTS

| 9,585,125 B2* | 2/2017 | Papasakellariou ...... H04L 5/005 |
| 9,591,636 B2* | 3/2017 | Papasakellariou ...... H04L 5/001 |

(Continued)

FOREIGN PATENT DOCUMENTS

| CN | 102547738 A | 7/2012 |
| CN | 103796315 A | 5/2014 |

(Continued)

OTHER PUBLICATIONS

NTT DOCOMO, "EPDCCH configuration for Rel-13 low complexity MTC" 3GPP TSG RAN WG1 Meeting #80bis, R1-152050, Belgrade, Serbia, Apr. 20-24, 2015, 3 pages.

(Continued)

*Primary Examiner* — Asad M Nawaz
*Assistant Examiner* — Berhanu D Belete
(74) *Attorney, Agent, or Firm* — Fish & Richardson P.C.

(57) ABSTRACT

Example control channel resource indication methods, user equipment, and network devices are described. One example method includes sending a preamble signal sequence by a user equipment. The user equipment receives higher layer signaling corresponding to the preamble signal sequence. The higher layer signaling is indicated by downlink control information carried in a common search space. A time-frequency resource detected by the user equipment when determining a control channel includes the common search space and user equipment-dedicated search space. The user equipment determines frequency domain resource location information of the user equipment-dedicated search space based on the higher layer signaling. The frequency domain resource location information includes a quantity of frequency domain resource units occupied by the user equipment-dedicated search space in frequency domain and a location of the frequency domain resource unit.

12 Claims, 10 Drawing Sheets

(56) References Cited

U.S. PATENT DOCUMENTS

| | | | |
|---|---|---|---|
| 2011/0038275 A1* | 2/2011 | Kim | H04W 48/16 370/252 |
| 2011/0201333 A1* | 8/2011 | Kwon | H04L 5/0091 455/434 |
| 2013/0083747 A1 | 4/2013 | Narasimha et al. | |
| 2013/0114532 A1* | 5/2013 | Choi | H04L 5/0091 370/329 |
| 2013/0230017 A1* | 9/2013 | Papasakellariou | H04L 1/1861 370/330 |
| 2013/0294366 A1* | 11/2013 | Papasakellariou | H04L 1/0046 370/329 |
| 2014/0016596 A1* | 1/2014 | Kim | H04W 72/042 370/329 |
| 2014/0036828 A1* | 2/2014 | Papasakellariou | H04W 48/10 370/329 |
| 2014/0064214 A1* | 3/2014 | Papasakellariou | H04W 72/042 370/329 |
| 2014/0071911 A1* | 3/2014 | Horiuchi | H04L 5/0023 370/329 |
| 2014/0071915 A1* | 3/2014 | Papasakellariou | H04W 72/042 370/329 |
| 2014/0071934 A1* | 3/2014 | Frenne | H04L 5/0053 370/330 |
| 2014/0092792 A1* | 4/2014 | Kim | H04L 5/0023 370/280 |
| 2014/0133331 A1 | 5/2014 | Fu et al. | |
| 2014/0177547 A1* | 6/2014 | Guo | H04L 5/0053 370/329 |
| 2014/0241310 A1* | 8/2014 | Guan | H04W 72/0406 370/330 |
| 2014/0286277 A1* | 9/2014 | Jang | H04L 5/0048 370/329 |
| 2015/0049704 A1* | 2/2015 | Park | H04L 5/0048 370/329 |
| 2015/0189574 A1* | 7/2015 | Ng | H04W 24/08 370/252 |
| 2015/0201405 A1* | 7/2015 | Liu | H04L 5/0053 370/329 |
| 2015/0215906 A1* | 7/2015 | Park | H04W 72/12 370/312 |
| 2015/0223210 A1* | 8/2015 | Guo | H04W 72/042 370/329 |
| 2015/0229450 A1* | 8/2015 | Noh | H04L 5/0051 370/329 |
| 2015/0236828 A1* | 8/2015 | Park | H04L 27/2656 375/340 |
| 2015/0327224 A1* | 11/2015 | Guan | H04L 41/12 370/329 |
| 2015/0334762 A1* | 11/2015 | Yang | H04W 76/15 370/329 |
| 2016/0014752 A1* | 1/2016 | Papasakellariou | H04L 5/0007 370/329 |
| 2017/0019889 A1* | 1/2017 | Horiuchi | H04L 5/0053 |
| 2017/0223687 A1* | 8/2017 | Kuchibhotla | H04L 5/0094 |
| 2017/0290017 A1 | 10/2017 | Takeda et al. | |
| 2018/0014287 A1* | 1/2018 | Papasakellariou | H04W 48/10 |
| 2018/0092070 A1* | 3/2018 | Liao | H04L 1/0038 |
| 2018/0139586 A1* | 5/2018 | Park | H04W 4/06 |
| 2018/0205522 A1* | 7/2018 | Wang | H04L 5/0053 |
| 2018/0227893 A1* | 8/2018 | Park | H04W 72/042 |
| 2018/0234952 A1* | 8/2018 | Shi | H04L 5/0053 |
| 2018/0332570 A1* | 11/2018 | Xia | H04W 8/06 |
| 2018/0359745 A1* | 12/2018 | Yeo | H04L 1/1854 |
| 2018/0368122 A1* | 12/2018 | Kuchibhotla | H04L 5/0007 |
| 2019/0132093 A1* | 5/2019 | Aiba | H04W 72/0446 |
| 2021/0136546 A1* | 5/2021 | Jamadagni | H04L 5/0053 |

FOREIGN PATENT DOCUMENTS

| | | |
|---|---|---|
| CN | 104012161 A | 8/2014 |
| EP | 3352520 A1 | 7/2018 |
| JP | 2013236278 A | 11/2013 |
| JP | 2013239782 A | 11/2013 |
| JP | 2016504801 A | 2/2016 |
| RU | 2552178 C2 | 6/2015 |
| WO | 2014165678 A2 | 10/2014 |
| WO | 2016047729 A1 | 3/2016 |
| WO | 2016163126 A1 | 10/2016 |

OTHER PUBLICATIONS

Ericsson, "Summary of e-mail discussions on downlink control signaling" 3 GPP TSG-RAN WG1 Meeting #87, R1-1612908, Reno, NV, USA, Nov. 14-18, 2016, 37 pages.

Office Action issued in Japanese Application No. 2019-536,105 dated Sep. 14, 2020, 9 pages (With English Translation).

PCT International Search Report and Written Opinion in International Application No. PCT/CN2017/120,221, dated Mar. 30, 2018, 16 pages (With English Translation).

Extended European Search Report issued in European Application No. 17888297.3 dated Nov. 8, 2019, 9 pages.

LG Electronics, "Remaining issues on M-PDCCH search space," 3GPP Draft; 3GPP TSG RAN WG1 Meeting #83, R1-156839, Anaheim, USA, Nov. 15-22, 2015, XP051003195, 10 pages.

Office Action issued in Japanese Application No. 2019-536105 dated Jun. 28, 2021, 7 pages (with English translation).

Office Action issued in Russian Application No. 2019123843/07(046462) dated Feb. 26, 2021, 20 pages (with English translation).

* cited by examiner

_(1)_

CONTROL CHANNEL RESOURCE INDICATION METHOD, USER EQUIPMENT, AND NETWORK DEVICE

CROSS-REFERENCE TO RELATED APPLICATIONS

This application is a continuation of International Application No. PCT/CN2017/120221, filed on Dec. 29, 2017, which claims priority to Chinese Patent Application No. 201611263794.6, filed on Dec. 30, 2016. The disclosures of the aforementioned applications are hereby incorporated by reference in their entireties.

TECHNICAL FIELD

The present invention relates to the communications field, and in particular, to a control channel resource indication method, a network device, and user equipment.

BACKGROUND

In a communications system, a network device needs to indicate a control channel time-frequency resource to user equipment. In a conventional technology, indication information of the control channel time-frequency resource is carried by a broadcast channel. Specifically, the network device indicates a size of a control channel frequency domain resource by using indication information carried in a physical broadcast channel (PBCH), and adds a size of a control channel time domain resource to a physical control format indicator channel (PCFICH).

A next generation communications system supports access by a plurality of user equipments with different bandwidths, and channel bandwidths that can be detected by all the user equipments are different. If a prior-art design solution is still used, the user equipment cannot learn of information about a dedicated operating frequency domain resource of the user equipment when establishing a connection to the network device, because the PBCH is common signaling and dedicated operating bandwidth cannot be allocated to each user equipment.

SUMMARY

Embodiments of the present invention provide a control channel resource indication method, a network device, and user equipment, so as to indicate, to user equipment in an initial access phase, a frequency domain resource location of search space in which a control channel is located.

According to a first aspect, a control channel resource indication method is provided, including: sending a preamble signal sequence; receiving higher layer signaling corresponding to the preamble signal sequence, where the higher layer signaling is indicated by downlink control information carried in common search space; and determining frequency domain resource location information of user equipment-dedicated search space based on the higher layer signaling, where the frequency domain resource location information includes a quantity of frequency domain resource units occupied by the user equipment-dedicated search space in frequency domain and a location of the frequency domain resource unit.

In this embodiment of the present invention, a bandwidth access capability message is sent in the preamble signal sequence or a third message, and indication information of the user equipment-dedicated search space may be received in the higher layer signaling, for example, a Message 2 or a Message 4, so that user equipment determines the user equipment-dedicated search space during initial access. In addition, different dedicated search space locations and sizes are determined for different user equipment bandwidth capabilities. The method expands a control channel capacity, decreases a control channel collision probability during the initial access, and reduces an access delay.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the preamble signal sequence sent by the user equipment includes indication information used to indicate a bandwidth access capability of the user equipment.

In a possible design, the higher layer signaling is random access response (RAR) signaling or radio resource control (RRC) signaling.

In a possible design, after the sending a preamble signal sequence, and before the receiving higher layer signaling, the method further includes: sending uplink acknowledgement information, where the uplink acknowledgement information includes the bandwidth access capability of the user equipment.

In a possible design, the method further includes: receiving broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a second aspect, a control channel resource indication method is provided, including: receiving a preamble signal sequence sent by user equipment; determining higher layer signaling corresponding to the preamble signal sequence, where the higher layer signaling is indicated by downlink control information carried in common search space, the higher layer signaling is used to indicate frequency domain resource location information of user equipment-dedicated search space, and the frequency domain resource location information includes a quantity of frequency domain resource units occupied by the user equipment-dedicated search space in frequency domain and a location of the frequency domain resource unit; and sending the higher layer signaling.

In this embodiment of the present invention, indication information of the user equipment-dedicated search space is received in the higher layer signaling, for example, a Message 2 or a Message 4, so that the user equipment determines the user equipment-dedicated search space during initial access. In addition, different dedicated search space locations and sizes are determined for different user equipment bandwidth capabilities. The method expands a control channel capacity, decreases a control channel collision probability during the initial access, and reduces an access delay.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the received preamble signal sequence includes indication information used to indicate a bandwidth access capability of the user equipment.

In a possible design, the higher layer signaling is random access response (RAR) signaling or radio resource control (RRC) signaling.

In a possible design, after the receiving a preamble signal sequence, and before the sending the higher layer signaling, the method further includes: receiving uplink acknowledgement information, where the uplink acknowledgement information includes the bandwidth access capability of the user equipment.

In a possible design, the method further includes: sending broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a third aspect, a control channel resource indication method is provided, including: receiving higher layer signaling, where the higher layer signaling is indicated by downlink control information carried in common search space; determining frequency domain resource location information of user equipment-dedicated search space based on the higher layer signaling, where the frequency domain resource location information includes a quantity of frequency domain resource units occupied by the user equipment-dedicated search space in frequency domain and a location of the frequency domain resource unit.

In this embodiment of the present invention, indication information of the user equipment-dedicated search space may be received in the higher layer signaling, for example, a Message 2 or a Message 4, so that user equipment determines the user equipment-dedicated search space during initial access. In addition, different dedicated search space locations and sizes are determined for different user equipment bandwidth capabilities. The method expands a control channel capacity, decreases a control channel collision probability during the initial access, and reduces an access delay.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the higher layer signaling is random access response (RAR) signaling or radio resource control (RRC) signaling.

In a possible design, before the receiving higher layer signaling, the method further includes: sending uplink acknowledgement information, where the uplink acknowledgement information includes a bandwidth access capability of the user equipment.

In a possible design, the method further includes: receiving broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a fourth aspect, a control channel resource indication method is provided, including: determining higher layer signaling, where the higher layer signaling is indicated by downlink control information carried in common search space, the higher layer signaling is used to indicate frequency domain resource location information of user equipment-dedicated search space, and the frequency domain resource location information includes a quantity of frequency domain resource units occupied by the user equipment-dedicated search space in frequency domain and a location of the frequency domain resource unit; and sending the higher layer signaling.

In this embodiment of the present invention, indication information of the user equipment-dedicated search space is received in the higher layer signaling, for example, a Message 2 or a Message 4, so that user equipment determines the user equipment-dedicated search space during initial access. In addition, different dedicated search space locations and sizes are determined for different user equipment bandwidth capabilities. The method expands a control channel capacity, decreases a control channel collision probability during the initial access, and reduces an access delay.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the higher layer signaling is random access response (RAR) signaling or radio resource control (RRC) signaling.

In a possible design, before the sending the higher layer signaling, the method further includes: receiving uplink acknowledgement information, where the uplink acknowledgement information includes a bandwidth access capability of the user equipment.

In a possible design, the method further includes: sending broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a fifth aspect, user equipment is provided, including: a sending unit, configured to send a preamble signal sequence; a receiving unit, configured to receive higher layer signaling corresponding to the preamble signal sequence, where the higher layer signaling is indicated by downlink control information carried in common search space; and a processing unit, configured to determine frequency domain resource location information of user equipment-dedicated search space based on the higher layer signaling, where the frequency domain resource location information includes a quantity of frequency domain resource units occupied by the user equipment-dedicated search space in frequency domain and a location of the frequency domain resource unit.

The user equipment reports a bandwidth access capability of the user equipment during initial access, and can determine the user equipment-dedicated search space appropriate for the bandwidth access capability of the user equipment in an initial access phase.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the preamble signal sequence sent by the sending unit includes indication information used to indicate a bandwidth access capability of the user equipment.

In a possible design, the higher layer signaling is random access response (RAR) signaling or radio resource control (RRC) signaling.

In a possible design, after the sending unit sends the preamble signal sequence, and before the receiving unit receives the higher layer signaling, the sending unit is further configured to send uplink acknowledgement information, where the uplink acknowledgement information includes the bandwidth access capability of the user equipment.

In a possible design, the receiving unit is further configured to receive broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a sixth aspect, a network device is provided, including: a receiving unit, configured to receive a preamble signal sequence sent by user equipment; a processing unit, configured to determine higher layer signaling corresponding to the preamble signal sequence, where the higher layer signaling is indicated by downlink control information carried in common search space, the higher layer signaling is used to indicate frequency domain resource location information of user equipment-dedicated search space, and the frequency domain resource location information includes a quantity of frequency domain resource units occupied by the user equipment-dedicated search space in frequency domain and a location of the frequency domain resource unit; and a sending unit, configured to send the higher layer signaling.

The network device receives a bandwidth access capability of the user equipment during initial access, and can send the higher layer signaling based on the bandwidth access capability in an initial access phase. The higher layer signaling is used to indicate the user equipment-dedicated search space matching the bandwidth access capability of the user equipment.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the preamble signal sequence received by the receiving unit includes indication information used to indicate the bandwidth access capability of the user equipment.

In a possible design, the higher layer signaling is random access response (RAR) signaling or radio resource control (RRC) signaling.

In a possible design, after the receiving unit receives the preamble signal sequence, and before the sending unit sends the higher layer signaling, the receiving unit is further configured to receive uplink acknowledgement information, where the uplink acknowledgement information includes the bandwidth access capability of the user equipment.

In a possible design, the sending unit is further configured to send broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a seventh aspect, user equipment is provided, including: a receiving unit, configured to receive higher layer signaling, where the higher layer signaling is indicated by downlink control information carried in common search space; and a processing unit, configured to determine frequency domain resource location information of user equipment-dedicated search space based on the higher layer signaling, and the frequency domain resource location information includes a quantity of frequency domain resource units occupied by the user equipment-dedicated search space in frequency domain and a location of the frequency domain resource unit.

The user equipment reports a bandwidth access capability of the user equipment during initial access, and can determine the user equipment-dedicated search space appropriate for the bandwidth access capability of the user equipment in an initial access phase.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the higher layer signaling is random access response (RAR) signaling or radio resource control (RRC) signaling.

In a possible design, the user equipment further includes a sending unit, configured to send uplink acknowledgement information before the receiving unit receives the higher layer signaling, where the uplink acknowledgement information includes the bandwidth access capability of the user equipment.

In a possible design, the receiving unit is further configured to receive broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to an eighth aspect, a network device is provided, including: a processing unit, configured to determine higher layer signaling, where the higher layer signaling is indicated by downlink control information carried in common search space, the higher layer signaling is used to indicate frequency domain resource location information of user equipment-dedicated search space, and the frequency domain resource location information includes a quantity of frequency domain resource units occupied by the user equipment-dedicated search space in frequency domain and a location of the frequency domain resource unit; and a sending unit, configured to send the higher layer signaling.

The network device receives a bandwidth access capability of user equipment during initial access, and can send the higher layer signaling based on the bandwidth access capability in an initial access phase. The higher layer signaling is used to indicate the user equipment-dedicated search space matching the bandwidth access capability of the user equipment.

In a possible design, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In a possible design, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

In a possible design, the higher layer signaling further includes a mapping manner of the user equipment-dedicated search space in frequency domain, and the mapping manner includes continuous mapping and discrete mapping; and when the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

In a possible design, the higher layer signaling further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible design, a scrambling code sequence of the reference signal is used to demodulate the user equipment-dedicated search space of the user equipment.

In a possible design, the aggregation level information includes a quantity of elements included in a set of an aggregation level of the user equipment-dedicated search space and/or a value of the aggregation level.

In a possible design, a control channel time-frequency resource includes the common search space and the user equipment-dedicated search space; and when a size of the control channel time-frequency resource is greater than a predefined threshold, a control channel aggregation level set is a first set; or when a size of the control channel time-frequency resource is less than a predefined threshold, a control channel aggregation level set is a second set.

In a possible design, the higher layer signaling further includes timing advance indication information of uplink transmission, and the timing advance indication information is used to indicate a time difference relative to downlink transmission timing when the user equipment sends uplink information.

In a possible design, the higher layer signaling is random access response (RAR) signaling or radio resource control (RRC) signaling.

In a possible design, the network device further includes a receiving unit, configured to receive uplink acknowledgement information before the sending unit sends the higher layer signaling, where the uplink acknowledgement information includes the bandwidth access capability of the user equipment.

In a possible design, the sending unit is further configured to send broadcast information, where the broadcast information includes information used to indicate a mapping manner of the common search space, and the mapping manner includes discrete mapping and continuous mapping.

In a possible design, the broadcast information includes an indication field, and the indication field is used to indicate the mapping manner of the common search space, or a scrambling code used by the broadcast information is used to indicate the mapping manner of the common search space.

According to a ninth aspect, user equipment is provided, including a processor, a receiver, a memory, and a bus system. The processor, the receiver, and the memory are connected by using the bus system. The memory is configured to store an instruction or code. The processor is configured to execute the instruction or the code stored in the memory, so that the user equipment performs the method according to any one of the first aspect or the possible implementations of the first aspect or any one of the third aspect or the possible implementations of the third aspect.

According to a tenth aspect, a network device is provided, including a processor, a transmitter, and a memory. The memory is configured to store an instruction or code. The processor is configured to execute the instruction or the code stored in the memory, so that the network device performs the method according to any one of the second aspect or the possible implementations of the second aspect or any one of the fourth aspect or the possible implementations of the fourth aspect.

According to an eleventh aspect, a computer readable storage medium is provided. The computer readable storage medium stores a program. The program causes user equipment to perform the method according to any one of the first aspect or the possible implementations of the first aspect or any one of the third aspect or the possible implementations of the third aspect.

According to a twelfth aspect, a computer readable storage medium is provided. The computer readable storage medium stores a program. The program causes a network device to perform the method according to any one of the second aspect or the possible implementations of the second aspect or any one of the fourth aspect or the possible implementations of the fourth aspect.

According to a thirteenth aspect, a computer program product is provided. The computer program product includes computer program code. When the computer program code is executed by user equipment, the user equipment is caused to perform the method according to any one of the first aspect or the possible implementations of the first aspect or any one of the third aspect or the possible implementations of the third aspect.

According to a fourteenth aspect, a computer program product is provided. The computer program product includes computer program code. When the computer program code is executed by a network device, the network device is caused to perform the method according to any one of the second aspect or the possible implementations of the second aspect or any one of the fourth aspect or the possible implementations of the fourth aspect.

According to a fifteenth aspect, a control channel resource indication apparatus is provided. The apparatus includes at least one processor and at least one storage medium. The at least one storage medium stores an instruction. When the instruction is executed by the processor, the processor is caused to perform the method according to any one of the first aspect or the possible implementations of the first aspect, any one of the second aspect or the possible implementations of the second aspect, any one of the third aspect or the possible implementations of the third aspect, or any one of the fourth aspect or the possible implementations of the fourth aspect.

According to a sixteenth aspect, a communications system is provided. The communications system includes the user apparatus according to any one of the fifth aspect or the possible implementations of the fifth aspect, any one of the seventh aspect or the possible implementations of the seventh aspect, or the ninth aspect, and the network device in any one of the sixth aspect or the possible implementations of the sixth aspect, any one of the eighth aspect or the possible implementations of the eighth aspect, or the tenth aspect.

DESCRIPTION OF EMBODIMENTS

The following describes the technical solutions in the embodiments of the present invention with reference to the accompanying drawings in the embodiments of the present invention.

It should be understood that the technical solutions in the embodiments of the present invention may be applied to various communications systems, such as a Wireless Fidelity (Wi-Fi) system, a Worldwide Interoperability for Microwave Access (WiMAX) system, a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS) system, a cellular system related to the 3rd Generation Partnership Project (3GPP), and a 5th generation mobile telecommunications (5G) system. This is not limited in the embodiments of the present invention.

It should be understood that the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

"First" and "second" in the embodiments of the present invention are merely used for differentiation and do not indicate a sequence or a size.

Figure 1:
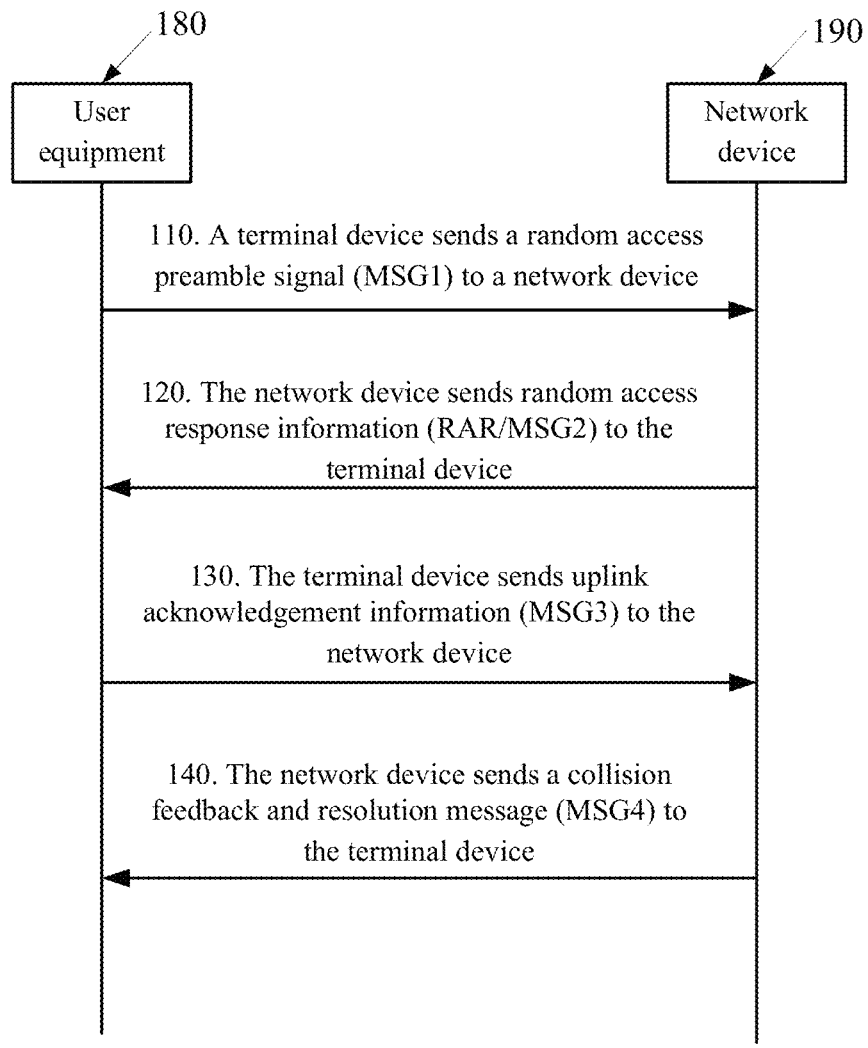
FIG. 1 is a schematic diagram of an initial access process.

As shown in FIG. 1, a communications system includes user equipment 180 and a network device 190.

This embodiment of the present invention may be used for wireless networks of different standards. Therefore, the network device 190 may include different network elements in different wireless communications systems. For example, in a 5th generation mobile telecommunications system, the network device 190 may be a 5G network device, for example, a gNB (gNodeB); in radio access networks in Long Term Evolution (LTE) and LTE-A, the network device 190 may include an evolved network device (eNodeB, eNB); in a radio access network in Wideband Code Division Multiple Access (WCDMA), the network device 190 may include a radio network controller (RNC) and an NodeB. Similarly, in other wireless networks such as a Worldwide Interoperability for Microwave Access (WiMax) network, a solution similar to that in this embodiment of the present invention may also be used, and only related modules may be different. This is not limited in this embodiment of the present invention.

It should be further understood that, in this embodiment of the present invention, the user equipment 180 may also be referred to as a terminal device, a mobile station (MS), a mobile terminal, or the like. The terminal may communicate with one or more core networks by using a radio access network (RAN). For example, the user equipment 180 may be a mobile phone (or referred to as a "cellular" phone) or a computer having a communication function. For example, the user equipment 180 may alternatively be a portable mobile apparatus, a pocket-sized mobile apparatus, a hand-held mobile apparatus, a computer built-in mobile apparatus, or an in-vehicle mobile apparatus.

For ease of understanding by a person skilled in art, the following explains some terms in the present invention.

(1) Symbol: A symbol includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol, and may be specifically determined depending on an actual case. Details are not described herein.

(2) Subcarrier width: A subcarrier width is a finest granularity in frequency domain. For example, in LTE, a subcarrier width of one subcarrier is 15 KHz.

(3) Frequency domain resource unit: A frequency domain resource unit is a resource occupying P continuous subcarriers in frequency domain, and a size of a resource occupied in time domain is not particularly limited. P is a natural number greater than 1. For example, one frequency domain resource unit may occupy two, four, six, or 12 continuous subcarriers.

FIG. 1 is a schematic diagram of an initial access process. In the initial access process, the following information exchange may take place between the user equipment 180 and the network device 190:

Step 110: The user equipment 180 sends a preamble signal sequence to the network device 190, where the preamble signal sequence is also referred to as a first message (Message 1).

Step 120: In response to the received preamble signal sequence, the network device 190 sends random access response (RAR) to the user equipment 180, where the RAR is also referred to as a second message (Message 2).

After sending the preamble, the user equipment 180 detects common search space in a period of time, to receive indication information that indicates reception of the RAR. If the RAR with which the network device 190 replies is not received in this RAR time window, it is considered that a current random access process fails.

Step 130: After receiving the RAR, the user equipment 180 sends uplink acknowledgement information on an uplink data channel based on information included in the RAR, where the uplink acknowledgement information is also referred to as a third message (Message 3).

The user equipment 180 sends, based on uplink scheduling indication information included in the received RAR, the third message on a time-frequency resource indicated in the uplink scheduling indication information. The third message includes a radio resource control (RRC) connection request, and needs to carry at least temporary user equipment identifier information, for example, a unique identifier that is allocated to each user equipment in a non-connected state.

Step 140: After sending the uplink acknowledgement information, the user equipment 180 receives response information sent by the network device 190 on a downlink data channel, where the response information is also referred to as a collision resolution message or a fourth message (Message 4).

By exchanging the foregoing messages, the user equipment 180 may establish an RRC connection to the network device 190.

However, during initial access, the network device 190 cannot learn of a bandwidth access capability of the user equipment 180, and therefore cannot allocate dedicated operating bandwidth to the user equipment 180; consequently, the user equipment 180 cannot learn of information about a dedicated operating frequency domain resource during the initial access.

According to the method described in this embodiment of the present invention, in a process of RRC connection establishment between the user equipment and the network device, the bandwidth access capability of the user equipment can be learned of in a timely manner. This reduces an access delay.

It should be understood that an initial access scenario is used herein as an example. In another similar scenario in which user equipment sends a preamble to a network device to request to establish an RRC connection, for example, an RRC connection re-establishment scenario or a scenario in which user equipment is handed over from a source network device to a target network device, the method described in this embodiment of the present invention is also applicable.

Figure 2:
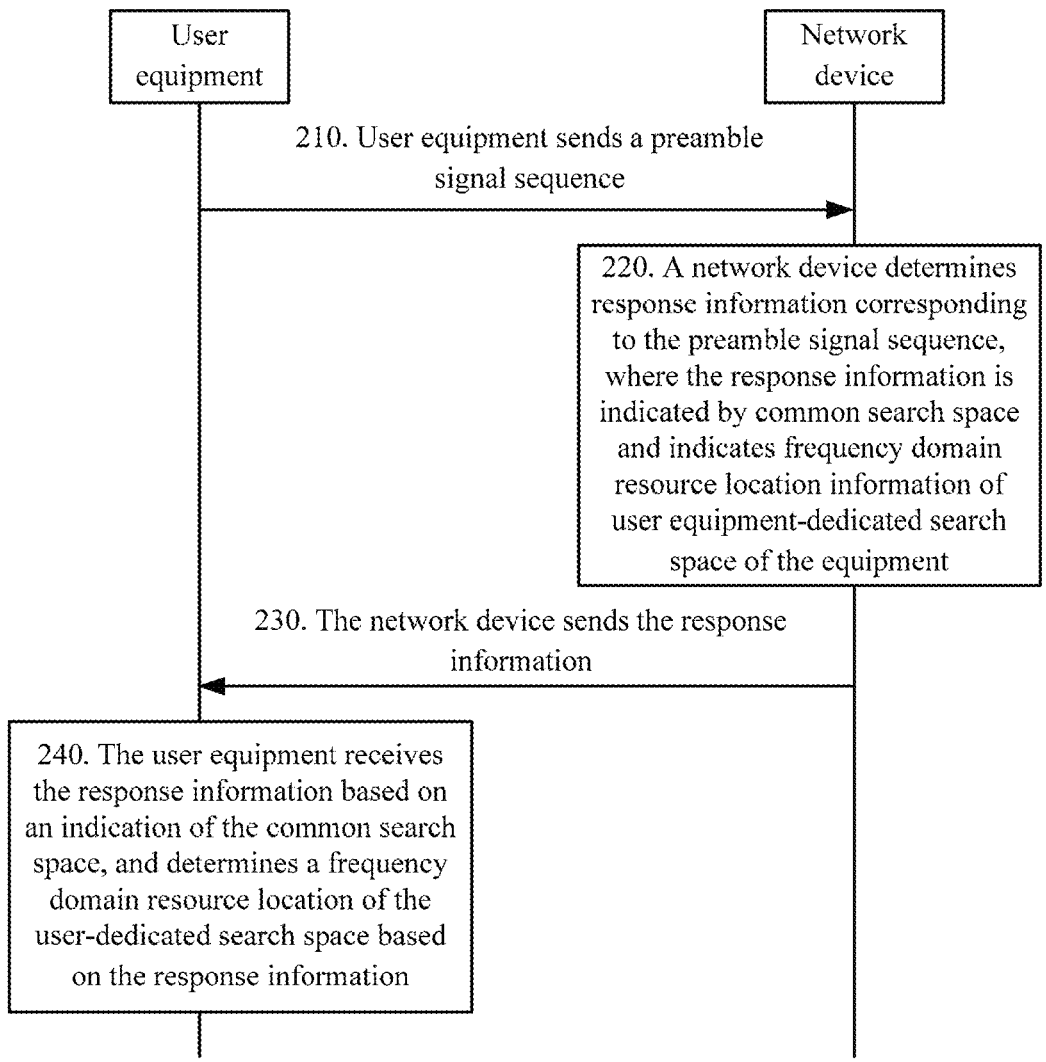
FIG. 2 is a schematic flowchart of a control channel resource indication method according to an embodiment of the present invention.

FIG. 2 is a schematic flowchart of a control channel resource indication method 200 according to an embodiment of the present invention. As shown in FIG. 2, the method 200 includes the following content.

Step 210: User equipment sends a preamble signal sequence, that is, a preamble or a Message 1, to a network device.

The user equipment sends the preamble to the network device, to notify the network device that there is a random access request, and in this way, the network device can estimate a transmission delay between the network device and the user equipment and calibrate uplink timing based on the transmission delay.

Optionally, the preamble signal sequence may be a Zadoff Chu sequence.

Step 220: The network device determines response information corresponding to the preamble signal sequence, where the response information is indicated by downlink control information carried in common search space. A time-frequency resource detected by the user equipment when determining a control channel includes the common search space and user equipment-dedicated search space. The response information includes frequency domain resource location information of the user equipment-dedicated search space. The frequency domain resource location information includes a quantity of frequency domain resource units occupied by the user equipment-dedicated search space in frequency domain and a location of the frequency domain resource unit.

Optionally, the response information may be a second message, namely, RAR/Message 2 information. Alternatively, the response information may be a fourth message, namely, Message 4 information. In other words, in this specification, the response information corresponding to the preamble signal sequence is not limited to the first piece of response information that is received after the preamble signal sequence is sent.

Case 1: The response information corresponding to the preamble signal sequence includes the second message, and there is an indirect binding relationship between a time-frequency resource location at which the second message is received and the preamble signal sequence. The binding relationship is that the user equipment determines, based on sequence information for sending the preamble signal sequence, indication information that is included in the common search space and that is used to receive the RAR. The indication information includes indication information of the time-frequency resource location at which the RAR is received, and the sent preamble signal sequence corresponds to a unique piece of time-frequency resource indication information for receiving the RAR.

Case 2: The response information corresponding to the preamble signal sequence includes the fourth message. The fourth message includes user identity information of the user equipment, for example, a cell radio network temporary identity (C-RNTI).

Optionally, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

In addition, optionally, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

Figure 3:
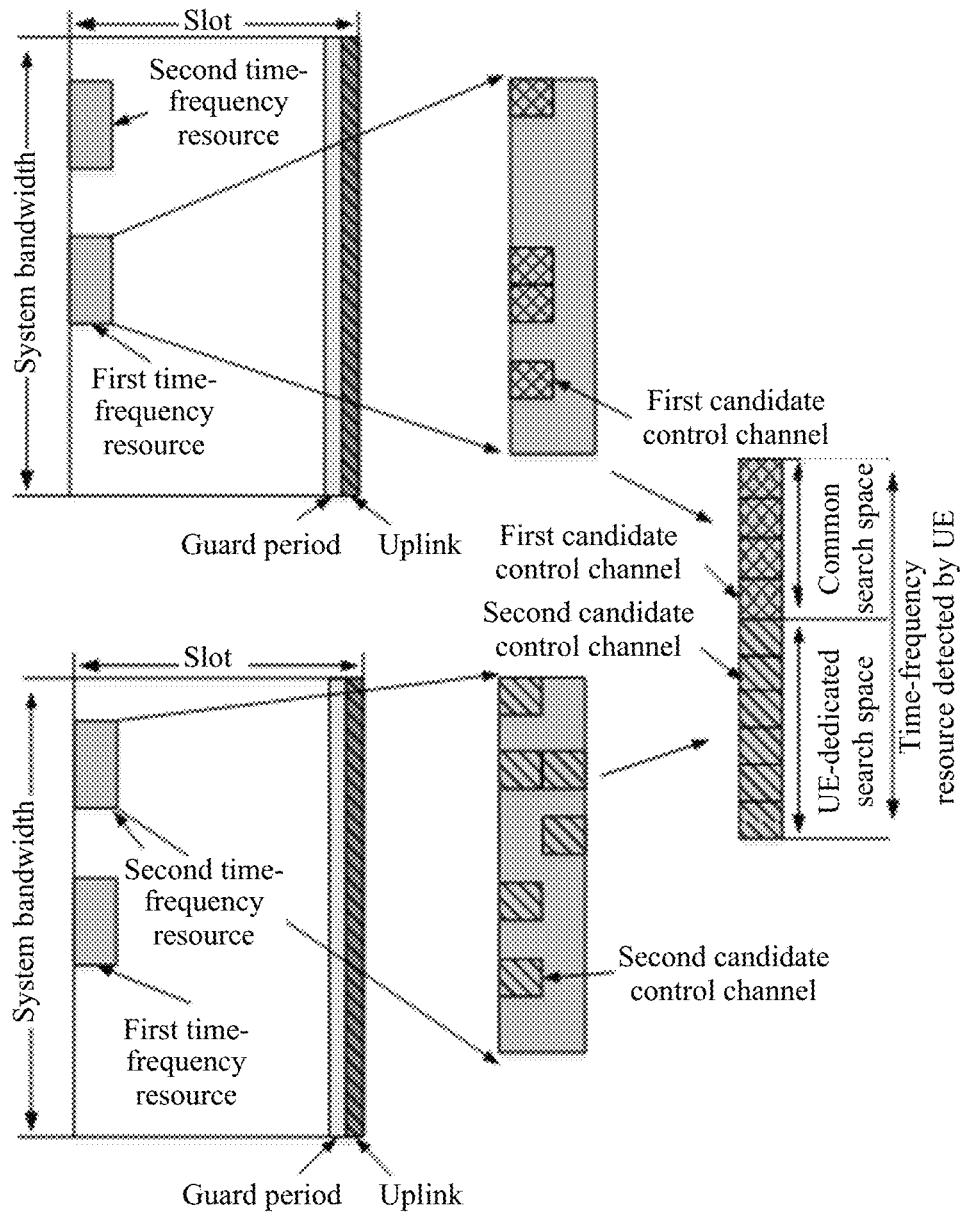
FIG. 3 is a schematic structural diagram of common search space and user equipment-dedicated search space according to an embodiment of the present invention.

As shown in FIG. 3, the user equipment needs to detect the time-frequency resource when determining the control channel. Specifically, the user equipment performs detection in the common search space on the first time-frequency resource, and detects, in one or more first candidate control channels, the downlink control information sent by the network device.

All time-frequency resources of the first time-frequency resource may be the common search space; or as shown in FIG. 3, some time-frequency resources of the first time-frequency resource may be the common search space of the user equipment.

Optionally, the time-frequency resource, that is, the first time-frequency resource, on which a common control channel is located is indicated by a broadcast message or a system message.

For example, before step 210, the user equipment receives broadcast information and determines a frequency domain location of the first time-frequency resource. The broadcast information includes a quantity of frequency domain resource units and a location of the frequency domain resource unit.

Step 230: The network device sends the response information to the user equipment.

Step 240: The user equipment receives the response information based on an indication of the common search space, and determines the frequency domain resource location information of the user equipment-dedicated search space based on the response information.

Optionally, the user equipment determines the frequency domain location of the user equipment-dedicated search space based on the response information. The frequency domain resource location information includes the quantity of frequency domain resource units occupied by the user equipment-dedicated search space in frequency domain and the location of the frequency domain resource unit.

As shown in FIG. 3, the user equipment-dedicated search space is located on the second time-frequency resource, the second time-frequency resource includes the plurality of second candidate control channels, and the set of the second candidate control channels constitutes the user equipment-dedicated search space.

Optionally, the second time-frequency resource partially overlaps with or does not overlap with the first time-frequency resource. In other words, the second time-frequency resource includes at least one frequency domain resource unit, where the frequency domain resource unit is not included in the first time-frequency resource.

Optionally, after determining the user equipment-dedicated search space, the user equipment detects one or more second candidate control channels in the user equipment-dedicated search space as a user equipment-dedicated control channel.

The network device adds indication information of the user equipment-dedicated search space to a response message, for example, a Message 2 or a Message 4, corresponding to the preamble signal sequence, so that the user equipment determines the user equipment-dedicated search space during initial access. In addition, different dedicated search space locations and sizes are determined for different user equipment bandwidth capabilities. The method expands a control channel capacity, decreases a control channel collision probability during the initial access, and reduces an access delay.

Optionally, the frequency domain resource location information of the user equipment-dedicated search space further includes a mapping manner of a frequency domain resource. In other words, a mapping manner of the user equipment-dedicated search space in frequency domain is a mapping manner of a second candidate control channel in the user equipment-dedicated search space. As shown in FIG. 4 (a) and FIG. 4 (b), the mapping manner of the frequency domain resource may include continuous mapping and discrete mapping.

Figure 4A:
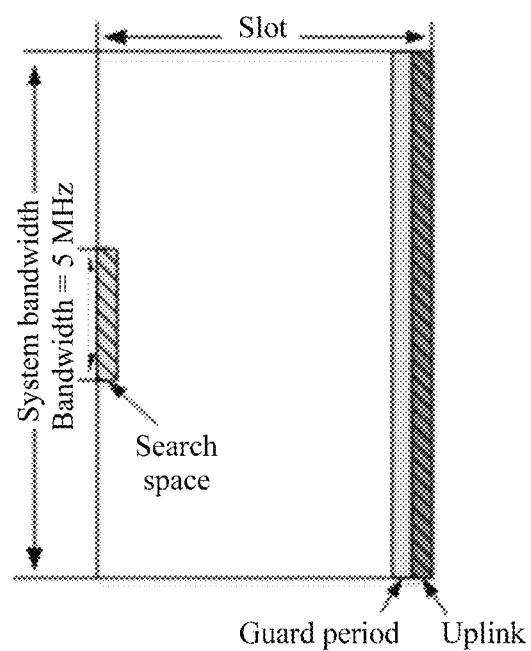
FIG. 4(a) is a schematic structural diagram of search space that corresponds to continuously-distributed frequency domain resource units according to an embodiment of the present invention.

Case 1: When the mapping manner of the frequency domain resource is the continuous mapping, the frequency domain resource location information further includes a start location information of the frequency domain resource unit. As shown in FIG. 4(a), frequency domain resources of the user equipment-dedicated search space are a plurality of continuous frequency domain resource units.

Figure 4B:
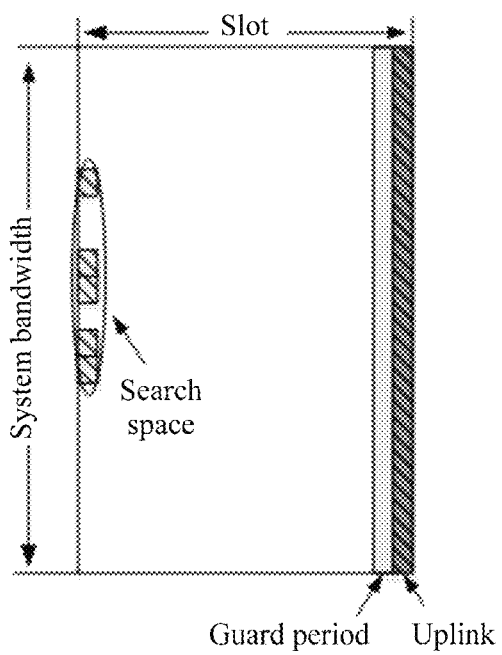
FIG. 4(b) is a schematic structural diagram of search space that corresponds to continuously-distributed frequency domain resource units according to an embodiment of the present invention.

Case 2: When the mapping manner of the frequency domain resource is the discrete mapping, the frequency domain resource location information further includes a location of at least one frequency domain resource unit occupied by the user equipment-dedicated search space in frequency domain. As shown in FIG. 4(b), frequency domain resources of the control channel are a plurality of discrete frequency domain resource units.

In this case, if the discrete frequency domain resource units are distributed regularly, for example, distributed at equal intervals, locations of all the frequency domain resource units can be learned of by learning of a location of one frequency domain resource unit; if the discrete frequency domain resource units are distributed irregularly, locations of all the frequency domain resource units need to be learned of.

Optionally, the response information corresponding to the preamble information further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

Figure 5:
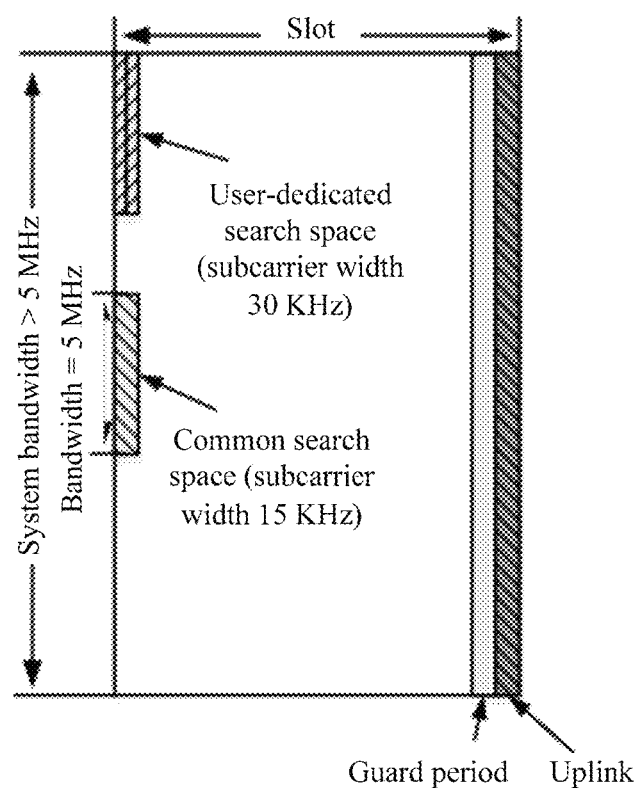
FIG. 5 is a schematic structural diagram of a subcarrier width according to an embodiment of the present invention.

In an implementation, the response information corresponding to the preamble signal sequence includes the subcarrier width information of the user equipment-dedicated search space. A subcarrier width is a finest granularity in frequency domain, and a subcarrier width used in search space is a finest granularity, used to send the control channel, of a frequency domain resource. Optionally, different subcarrier widths may be used in user equipment-dedicated search space of different user equipments. A subcarrier width used in common search space of user equipment may be different from a subcarrier width used in user equipment-dedicated search space of the same user equipment. As shown in FIG. 5, a subcarrier width used in the common search space is 15 KHz, and a subcarrier width used in the user equipment-dedicated search space is 30 KHz.

In an implementation, the response information corresponding to the preamble information includes the scrambling code sequence information of the reference signal, and a scrambling code sequence of the reference signal is used to demodulate one or more second candidate control channels in the user equipment-dedicated search space.

Figure 6:
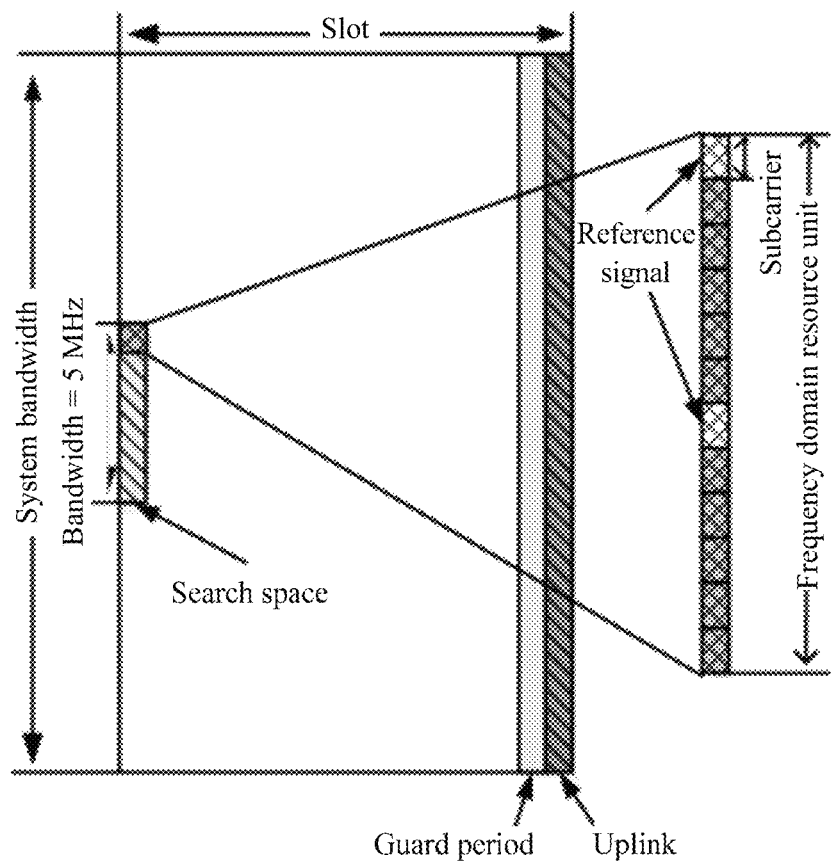
FIG. 6 is a schematic structural diagram of a reference signal in search space according to an embodiment of the present invention.
Figure 7:
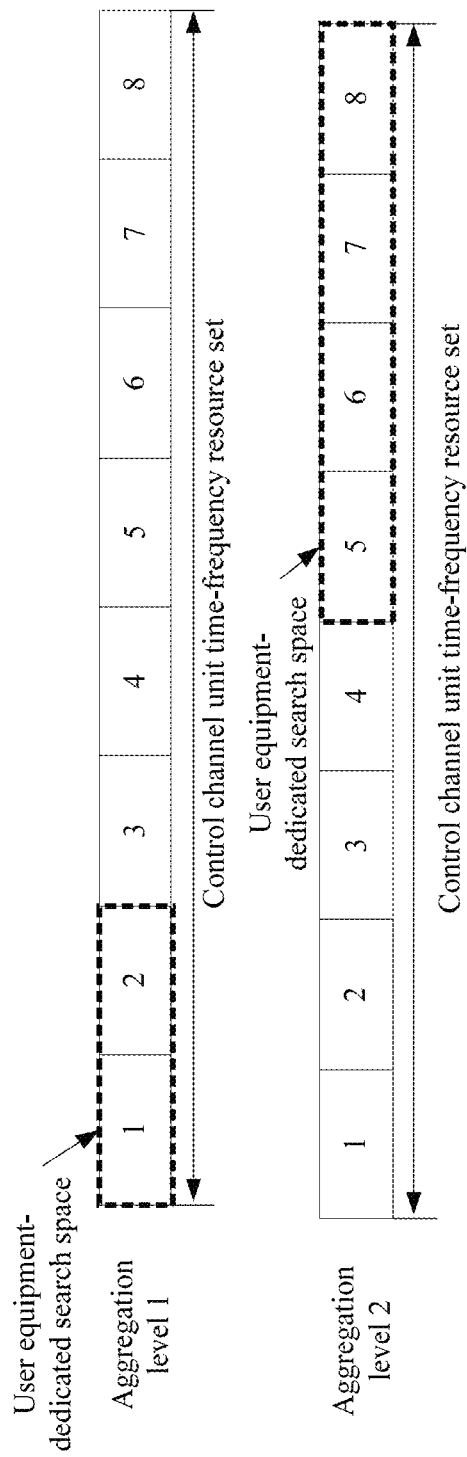
FIG. 7 is a schematic diagram of aggregation levels of search space according to an embodiment of the present invention.

As shown in FIG. 6, the user equipment-dedicated search space includes a plurality of frequency domain resource units, and each frequency domain resource unit includes the reference signal used to demodulate the user equipment-dedicated search space.

Optionally, the scrambling code sequence of the reference signal may be a Gold sequence. A different scrambling code sequence is generated from a different initial value of the Gold sequence. The initial value may be calculated based on a user equipment ID included in the response information. The user equipment ID may be a temporary user equipment ID fed back in the second message, or user identity information of the user equipment, for example, a C-RNTI, included in the fourth message.

The Gold sequence may be represented by c(n), and a length of a generated sequence may be denoted by MPN, where n=0, 1, ..., MPN−1.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \qquad (1),$$

where $N_C$ is a predefined value. According to a method in the prior art, $N_C$=1600. An initial sequence includes a first initial sequence $x_1(n)$ (n=0, 1, ..., 30) and a second initial sequence $x_2(n)$ (n=0, 1, ..., 30).

The first initial sequence may be a predefined sequence, for example, $x_1(0)=1$ and $x_1(n)=0$, where n=1, ..., 30. The second initial sequence is determined based on indication information in random access response, for example, $c_{init}=\Sigma_{i=0}^{30} x_2(i) \cdot 2^i$, and $c_{init}=(\lfloor n_s/2 \rfloor+1) \cdot (2n_{ID}^{(nSCID)}+1) \cdot 2^{16}+n_{SCID}$, where $n_{ID}^{(nSCID)}$ is a predefined value related to $n_{SCID}$, and $n_{SCID}$ is indicated by using the random access response.

In an implementation, the response information corresponding to the preamble signal sequence includes the aggregation level information of the user equipment-dedicated search space. An aggregation level indicates a quantity of control channel time-frequency resource unit included in one search space. The time-frequency resource unit includes one frequency domain resource unit in frequency domain, and includes at least one OFDM symbol in time domain. For example, the time-frequency resource unit includes at least four continuous subcarriers in frequency domain, and includes at least one OFDM symbol in time domain; or the time-frequency resource unit includes 12 continuous subcarriers in frequency domain, and includes at least one OFDM symbol in time domain.

If time-frequency resources occupied by the control channel include K control channel time-frequency resources, an aggregation level of the control channel is K. K is a natural number greater than or equal to 1. For example, K is equal to 1, 2, 4, or 8.

Optionally, the aggregation level information includes a quantity of elements included in a set of an aggregation level of the user equipment-dedicated search space and/or a value of the aggregation level.

The set of the aggregation level of the search space is a set including the aggregation level. For example, a first set may be {1, 2, 4, 8}. In this case, the set includes four elements, and a value of an aggregation level is 1, 2, 4, or 8. For example, a second set may be {1, 2}. In this case, the set includes two elements, and a value of an aggregation level is 1 or 2.

Optionally, a possible set of an aggregation level used in the user equipment-dedicated search space may be indirectly indicated by a size of a time-frequency resource of the user equipment-dedicated search space. If a size of a control channel time-frequency resource is greater than a predefined threshold, a control channel aggregation level set is a first set. If a size of a control channel time-frequency resource is less than a predefined threshold, a control channel aggregation level set is a second set.

For example, the set of the aggregation level includes a first set {1, 2, 4, 8} and a second set {1, 2}. A time-frequency resource of the user equipment-dedicated control channel includes N control channel time-frequency resource unit. When N is greater than a predefined threshold No, the set of the aggregation level included in the time-frequency resource of the user equipment-dedicated control channel is the first set {1, 2, 4, 8}. When N is less than a predefined threshold, the set of the aggregation level included in the time-frequency resource of the user equipment-dedicated control channel is the second set {1, 2}.

In an implementation, the response information corresponding to the preamble information includes the transmission mode of the search space. The transmission mode includes a space diversity, a beamforming-based transmit mode, or a multi-antenna based transmission mode.

Optionally, before step 210, the user equipment receives broadcast information. The broadcast information includes information used to indicate a mapping manner of the common search space, and the mapping manner includes discrete mapping and continuous mapping.

Optionally, the broadcast information includes an indication field. The indication field is used to indicate the mapping manner of the common search space. Alternatively, a scrambling code used by the broadcast information is used to indicate the mapping manner of the common search space.

For example, before step 210, the user equipment detects a synchronization signal, and receives information about a broadcast channel. After receiving the information about the broadcast channel, the user equipment obtains a location of the time-frequency resource on which the common control channel is located.

In a possible case, a location of a frequency domain resource occupied by the synchronization signal and the broadcast channel is indirectly bound to a resource location of a time-frequency resource set of the common search space. For example, the synchronization signal and the broadcast channel occupy N frequency domain resource units in an intermediate part of system bandwidth, where N is a natural number greater than or equal to 1 and is predefined. For example, in LTE, N=6, and a center location of the common search space is the same as a frequency domain center location occupied by the synchronization signal and the broadcast channel.

Optionally, a size of the common search space is predefined, for example, 5 MHz or M frequency domain resource units, where M is a natural number greater than or equal to 1.

Optionally, the broadcast information carried by the broadcast channel may include indication information that is used to indicate a size of the common search space. For example, 3-bit information is used to indicate a frequency domain width {5 MHz, 10 MHz, 20 MHz, 40 MHz, 80 MHz} of the basic common search space or a quantity of frequency domain resource units, such as {25, 50, 100, 200, 400} frequency domain resource units, occupied by the common search space.

The M frequency domain resource units included in the common search space may be a plurality of predefined continuous frequency domain resource units in frequency domain.

Alternatively, the user equipment receives the information about the broadcast channel, determines a scrambling code sequence used for transmission of the broadcast channel, and determines, based on the scrambling code sequence, whether the M frequency domain resource units included in a basic resource unit in frequency domain are a plurality of continuous frequency domain resource units or a plurality of discrete frequency domain resource units.

For example, the scrambling code sequence used for transmission of the broadcast channel includes a first scrambling code sequence and a second scrambling code sequence. The first scrambling code sequence corresponds to the continuous frequency domain resource units included in the search space, and the second scrambling code sequence corresponds to the discrete frequency domain resource units included in the search space.

Optionally, the broadcast information in the broadcast channel further includes 1-bit indication information, and the indication information is used to indicate whether a plurality of frequency domain resource units included in the common search space are a plurality of continuous frequency domain resource units or a plurality of discrete frequency domain resource units.

As described above, in step 220, the network device determines the response information corresponding to the preamble signal sequence. The response information may be the Message 2 or the Message 4.

In a possible case, the response information sent by the network device is the Message 2. To be specific, the response information further includes timing advance (TA) indication information of uplink transmission, and the timing advance indication information is used to indicate a time difference relative to downlink transmission timing when the user equipment sends uplink information.

In this case, the preamble signal sequence sent by the user equipment includes a bandwidth access capability of the user equipment.

That user equipments have different bandwidth capabilities means that frequency domain widths that can be used by the user equipments to receive or send signals are different because integrated components of the user equipments have different frequency domain characteristics. For example, user equipment using a component with a narrowband characteristic cannot transmit/receive a signal whose bandwidth is greater than the frequency domain width.

A frequency domain width used by user equipment to receive a channel is mainly related to a frequency domain width of a specific component, for example, a frequency domain filter or a radio frequency antenna, used by the user equipment.

Frequency domain filters included in some user equipments can receive a signal at high bandwidth, while frequency domain filters included in some user equipments can receive a signal at low bandwidth. Alternatively, antenna modules of some user equipments have narrowband transmit and receive characteristics, while antenna modules of some user equipments have wideband transmit and receive characteristics. Narrowband bandwidth and wideband bandwidth are relative concepts. For example, magnitudes of narrowband and wideband may be described as follows: A narrowband bandwidth is 5 MHz, and a wideband bandwidth is 20 MHz; or a narrowband bandwidth is 20 MHz, and a wideband bandwidth is 80 MHz.

In step 210, the user equipment sends the preamble signal sequence to the network device. As described in the foregoing optional solution, the preamble signal sequence may include the bandwidth access capability of the user equipment. In this case, the network device may send, by using the RAR information or the Message 2 information, the response information corresponding to the preamble signal sequence.

For example, after determining the bandwidth access capability of the user equipment, the network device sends, in the common search space, the downlink control information that is used to instruct the user equipment to receive the response information. The downlink control information is used to indicate a location of a frequency domain resource occupied by the response information.

Indication information of the control channel time-frequency resource is carried in the Message 2, so that the network device determines the bandwidth access capability of the user equipment during the initial access, and may consider, based on the bandwidth access capability of the user equipment, allocating the user equipment-dedicated search space to the user equipment. For example, a frequency domain resource for the Message 4 may be scheduled in the user equipment-dedicated search space rather than in the common search space. The method expands a control channel capacity, and decreases a control channel collision probability during the initial access.

In another possible implementation, the response information sent by the network device is higher layer signaling. In other words, the response message may be sent by using the Message 4.

In a collision resolution mechanism of the network device, the fourth message carries a unique identifier to indicate user equipment that wins out. Other user equipments that do not win out during collision resolution re-initiate random access.

In this case, after step 210 is performed, the network device sends the random access response, namely, the Message 2, to the user equipment. After receiving the Message 2, the user equipment sends uplink acknowledgement information, namely, a Message 3, to the network device. The Message 3 includes the bandwidth access capability of the user equipment.

The network device adds the indication information of the control channel time-frequency resource to the Message 4, so that the user equipment determines the user equipment-dedicated search space during the initial access. Because the Message 4 is sent after the Message 3, namely, the uplink acknowledgement information, the user equipment can report more details about a user bandwidth capability or other user capability information to the network device by using the Message 3, so that user equipment-dedicated search space information indicated by the network device by using the Message 4 is more accurate. In the method, the user equipment-dedicated search space is accurately configured for the user equipment, thereby expanding the control channel capacity. In addition, allocation of a frequency domain resource of the user equipment-dedicated search space is completed during the initial access. Therefore, the control channel collision probability is decreased during the initial access, and the access delay is reduced.

Optionally, when the network device adds the response information to the RAR information, the user equipment further determines a location of the time-frequency resource of the user equipment-dedicated search space based on the response information.

Optionally, after step 240, the method 200 may further include the following steps:

Step 250: When uplink synchronization fails, the user equipment triggers re-sending of a preamble signal sequence signal. The preamble signal sequence signal is the same as the preamble signal sequence signal in step 210. Details are not described herein again.

Step 260: The network device re-sends, based on the received preamble signal, corresponding response information. The response information is the same as the response information in step 220. Details are not described herein again.

Step 270: The user equipment reconfigures user equipment-dedicated search space based on the re-sent response information.

It can be ensured, by performing the foregoing steps, that after initial access contention fails, the user equipment can still obtain a frequency domain resource location of the user equipment-dedicated search space when re-sending the preamble signal sequence to connect to the network device.

Optionally, after step 240, the method 200 may further include the following steps:

Step 250': The network device sends higher layer control information, for example, RRC signaling, to the user equipment in an access state, where the higher layer control information includes indication information indicating a frequency domain resource of the user equipment-dedicated search space.

Step 260': The user equipment configures the user equipment-dedicated search space based on the received RRC signaling.

By performing the foregoing step, the user equipment can update, after an RRC connection succeeds, the user equipment-dedicated search space by receiving the RRC signaling sent by the network device.

The foregoing describes the control channel resource indication method according to the embodiments of the present invention with reference to FIG. 2 to FIG. 7. The following describes user equipment and a network device according to the embodiments of the present invention with reference to FIG. 8 to FIG. 11.

It should be understood that user equipment 800 according to an embodiment of the present invention may correspond to the user equipment in the control channel resource indication method 200 according to the embodiment of the present invention, and the following and other operations and/or functions of units of the user equipment 800 are for implementing corresponding procedures of the user equipment in the method 200 shown in FIG. 2. For brevity, details are not described herein again.

Figure 8:
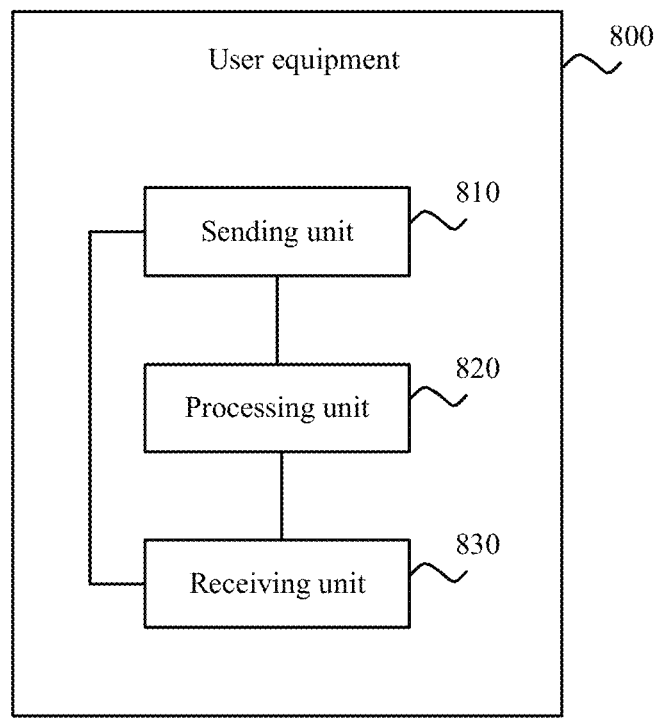
FIG. 8 is a schematic structural diagram of user equipment according to an embodiment of the present invention.

FIG. 8 is a schematic structural diagram of the user equipment 800 according to the embodiment of the present invention. As shown in FIG. 8, the user equipment 800 includes a sending unit 810, a processing unit 820, and a receiving unit 830.

The sending unit 810 is configured to send a preamble signal sequence.

The receiving unit 830 is configured to receive response information corresponding to the preamble signal sequence, where the response information is indicated by downlink control information carried in common search space, and a time-frequency resource detected by the user equipment when determining a control channel includes the common search space and user equipment-dedicated search space.

The processing unit 820 is configured to determine frequency domain resource location information of the user equipment-dedicated search space based on the response information, where the frequency domain resource location information includes a quantity of frequency domain resource units occupied by the user equipment-dedicated search space in frequency domain and a location of the frequency domain resource unit.

Optionally, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

Optionally, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

For details about a relationship between the first time-frequency resource, the common search space, the first candidate control channel, and a plurality of time-frequency resource units and a relationship between the second time-frequency resource, the user equipment-dedicated search space, the second candidate control channel, and a plurality of time-frequency resource units, refer to related descriptions of FIG. 3 and related descriptions in the method 200.

Optionally, the response information further includes a mapping manner of the user equipment-dedicated search space in frequency domain, and the mapping manner includes continuous mapping and discrete mapping.

When the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

Optionally, the response information further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

In a possible manner, a scrambling code sequence of the reference signal is used to demodulate one or more second candidate control channels in the user equipment-dedicated search space of the user equipment. For details, refer to descriptions of the scrambling code sequence of the reference signal in the method 200.

Optionally, the aggregation level information includes a quantity of elements included in a set of an aggregation level of the user equipment-dedicated search space and/or a value of the aggregation level. For details, refer to related descriptions of the aggregation level in the method 200.

Optionally, the response information further includes timing advance indication information of uplink transmission, and the timing advance indication information is used to indicate a time difference relative to downlink transmission timing when the user equipment sends uplink information. In this case, the response information corresponding to the preamble signal sequence includes a second message.

Optionally, the preamble signal sequence sent by the sending unit 810 includes indication information used to indicate a bandwidth access capability of the user equipment.

Indication information of the control channel time-frequency resource is carried in the Message 2, so that the user equipment can report the bandwidth access capability during initial access, and a network device may consider, based on the bandwidth access capability of the user equipment, allocating the user equipment-dedicated search space to the user equipment. For example, a frequency domain resource for a Message 4 may be scheduled in the user equipment-dedicated search space rather than in the common search space. Therefore, a control channel collision probability is decreased during the initial access of the user equipment, and the accurate user equipment-dedicated search space can be learned of.

Optionally, the response information is higher layer signaling. In this case, the response information corresponding to the preamble signal sequence includes a fourth message.

Optionally, after the sending unit 810 sends the preamble signal sequence, and before the receiving unit 830 receives the response information, the sending unit 810 is further configured to send uplink acknowledgement information, where the uplink acknowledgement information includes the bandwidth access capability of the user equipment.

The indication information of the control channel time-frequency resource is carried in the Message 4, so that the user equipment determines the user equipment-dedicated search space during the initial access. Because the Message 4 is sent after a Message 3, namely, the uplink acknowledgement information, the user equipment can report more details about a user bandwidth capability or other user capability information to the network device by using the Message 3, so that user equipment-dedicated search space information indicated by the network device by using the Message 4 is more accurate. By reporting the bandwidth capability of the user equipment during access, the user equipment can accurately learn of the user equipment-dedicated search space, thereby expanding a control channel capacity. In addition, allocation of a frequency domain resource of the user equipment-dedicated search space is completed during the initial access. Therefore, the control channel collision probability is decreased during the initial access, and an access delay is reduced.

Optionally, the receiving unit 830 is further configured to receive broadcast information. The broadcast information includes information used to indicate a mapping manner of the common search space, and the mapping manner includes discrete mapping and continuous mapping.

Optionally, the broadcast information includes an indication field. The indication field is used to indicate the mapping manner of the common search space, or a scrambling code used by the broadcast information is used to indicate the mapping manner of the common search space. For details, refer to related descriptions of the broadcast information in the method 200.

Figure 9:
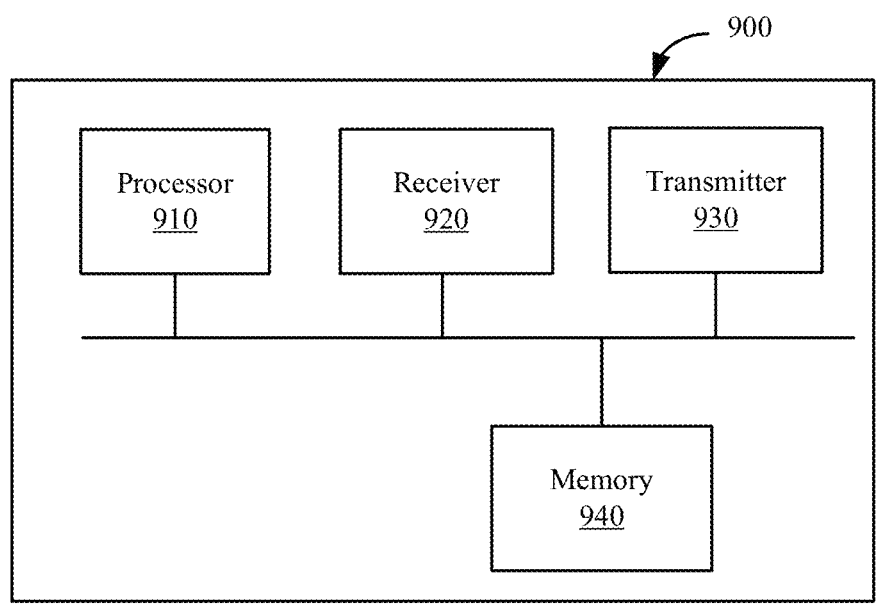
FIG. 9 is a schematic structural diagram of user equipment according to another embodiment of the present invention.

It should be noted that the processing unit 820 may be implemented by a processor, the sending unit 810 may be implemented by a transmitter, and the receiving unit 830 may be implemented by a receiver. FIG. 9 is a schematic structural diagram of user equipment 900 according to another embodiment of the present invention. As shown in FIG. 9, the user equipment 900 includes a processor 910, a receiver 920, a transmitter 930, and a memory 940.

The memory 940 may be configured to store code to be executed by the processor 910, and the like. The transmitter 930 is configured to send a signal under control of the processor 910. The receiver 920 is configured to receive a signal under control of the processor 910.

It should be understood that the user equipment 900 according to this embodiment of the present invention may correspond to the user equipment in the control channel resource indication method 200 according to the embodiment of the present invention and the user equipment 800 according to the embodiment of the present invention, and the foregoing and other operations and/or functions of the units of the user equipment 900 are for implementing corresponding procedures of the user equipment in the method 200 shown in FIG. 2. For brevity, details are not described herein again.

Figure 10:
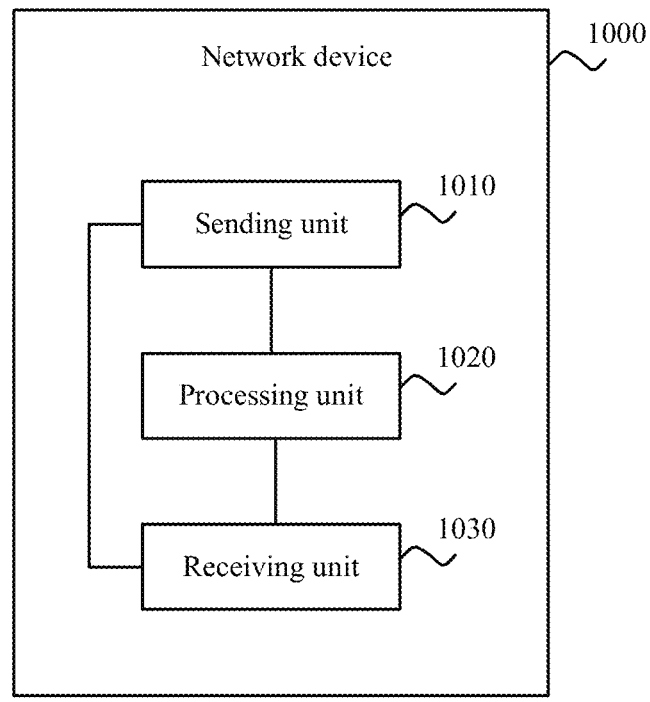
FIG. 10 is a schematic structural diagram of a network device according to an embodiment of the present invention.

FIG. 10 is a schematic structural diagram of a network device 1000 according to an embodiment of the present invention. As shown in FIG. 10, the network device 1000 includes a sending unit 1010, a processing unit 1020, and a receiving unit 1030.

The receiving unit 1030 is configured to receive a preamble signal sequence sent by user equipment.

The processing unit 1020 is configured to determine response information corresponding to the preamble signal sequence. The response information is indicated by downlink control information carried in common search space, a time-frequency resource detected by the user equipment when determining a control channel includes the common search space and user equipment-dedicated search space, the response information is used to indicate frequency domain resource location information of the user equipment-dedicated search space, the frequency domain resource location information includes a quantity of frequency domain resource units occupied by the user equipment-dedicated search space in frequency domain and a location of the frequency domain resource unit.

The sending unit 1010 is configured to send the response information.

Optionally, the common search space is located on a first time-frequency resource, the first time-frequency resource includes a plurality of first candidate control channels, each of the plurality of first candidate control channels includes one or more frequency domain resource units, and the common search space is a set of the plurality of first candidate control channels.

Optionally, the user equipment-dedicated search space is located on a second time-frequency resource, the second time-frequency resource includes a plurality of second candidate control channels, each of the plurality of second candidate control channels includes one or more frequency domain resource units, the user equipment-dedicated search space is a set of the plurality of second candidate control channels, and the second time-frequency resource partially overlaps with or does not overlap with the first time-frequency resource.

For details about a relationship between the first time-frequency resource, the common search space, the first candidate control channel, and a plurality of time-frequency resource units and a relationship between the second time-frequency resource, the user equipment-dedicated search space, the second candidate control channel, and a plurality of time-frequency resource units, refer to related descriptions of FIG. 3 and related descriptions in the method 200.

Optionally, the response information further includes a mapping manner of the user equipment-dedicated search space in frequency domain, and the mapping manner includes continuous mapping and discrete mapping.

When the mapping manner is the continuous mapping, the frequency domain resource location information further includes start location information of the frequency domain resource unit; or when the mapping manner is the discrete mapping, the frequency domain resource location information further includes a location of at least one frequency domain resource unit.

Optionally, the response information further includes one or more of the following information: subcarrier width information of the user equipment-dedicated search space, scrambling code sequence information of a reference signal in the user equipment-dedicated search space, aggregation level information of the user equipment-dedicated search space, and a transmission mode of the user equipment-dedicated search space.

Optionally, a scrambling code sequence of the reference signal is used to demodulate one or more second candidate control channels in the user equipment-dedicated search space of the user equipment. For details, refer to descriptions of the scrambling code sequence of the reference signal in the method 200.

Optionally, the aggregation level information includes a quantity of elements included in a set of an aggregation level of the user equipment-dedicated search space and/or a value of the aggregation level. For details, refer to related descriptions of the aggregation level in the method 200.

Optionally, the response information further includes timing advance indication information of uplink transmission, and the timing advance indication information is used to indicate a time difference relative to downlink transmission timing when the user equipment sends uplink information. In this case, the response information corresponding to the preamble signal sequence includes a second message.

Optionally, the preamble signal sequence received by the receiving unit 1030 includes indication information used to indicate a bandwidth access capability of the user equipment.

The network device adds indication information of a control channel time-frequency resource to the Message 2, so that the bandwidth access capability of the user equipment can be learned of during initial access, and the network device may consider, based on the bandwidth access capability of the user equipment, allocating the user equipment-dedicated search space to the user equipment. For example, a frequency domain resource for a Message 4 may be scheduled in the user equipment-dedicated search space rather than in the common search space. The method expands a control channel capacity, and decreases a control channel collision probability during the initial access.

Optionally, the response information is higher layer signaling. In this case, the response information corresponding to the preamble signal sequence includes a fourth message.

Optionally, after the receiving unit 1030 receives the preamble signal sequence, and before the sending unit 1010 sends the response information, the receiving unit 1030 is further configured to receive uplink acknowledgement information. The uplink acknowledgement information includes the bandwidth access capability of the user equipment.

The network device adds the indication information of the control channel time-frequency resource to the Message 4, so that the user equipment determines a frequency domain resource of the user equipment-dedicated search space during the initial access. Because the Message 4 is sent after a Message 3, namely, the uplink acknowledgement information, the user equipment can report more details about a user bandwidth capability or other user capability information to the network device by using the Message 3, so that user equipment-dedicated search space information indicated by the network device by using the Message 4 is more accurate. The network device accurately configures the user equipment-dedicated search space for the user equipment, thereby expanding the control channel capacity. The network device can complete allocation of the frequency domain resource of the user equipment-dedicated search space during the initial access, thereby decreasing the control channel collision probability during the initial access, and reducing an access delay.

Optionally, the sending unit is further configured to send broadcast information. The broadcast information includes information used to indicate a mapping manner of the common search space, and the mapping manner includes discrete mapping and continuous mapping.

Optionally, the broadcast information includes an indication field. The indication field is used to indicate the mapping manner of the common search space, or a scrambling code used by the broadcast information is used to indicate the mapping manner of the common search space. For details, refer to related descriptions of the broadcast information in the method 200.

It should be understood that the network device 1000 according to this embodiment of the present invention may correspond to the network device in the control channel resource indication method 200 according to the embodiment of the present invention, and the foregoing and other operations and/or functions of the units of the network device 1000 are for implementing corresponding procedures of the network device in the method 200 shown in FIG. 2. For brevity, details are not described herein again.

Figure 11:
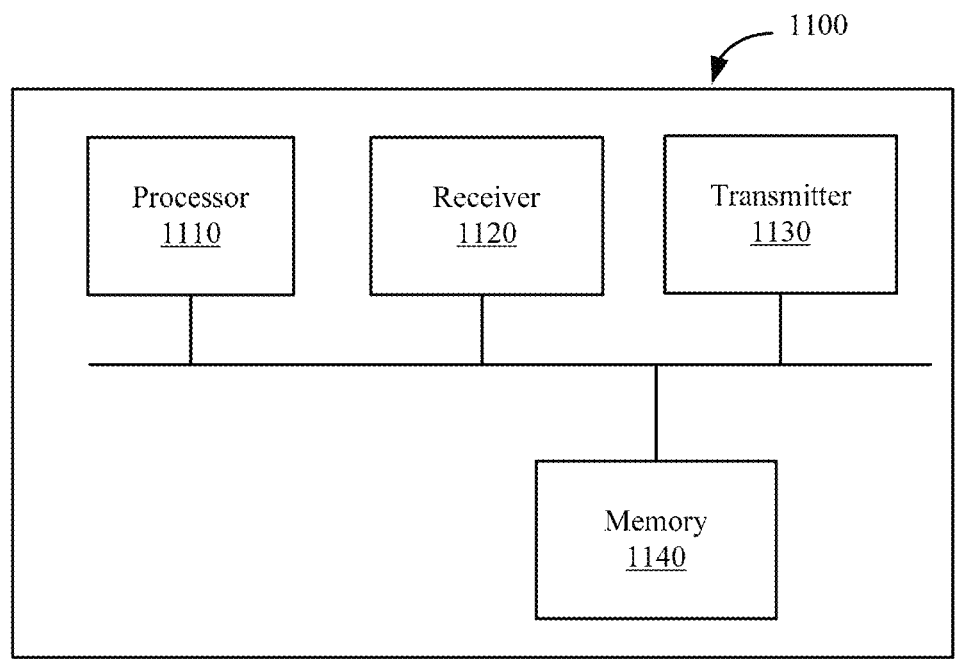
FIG. 11 is a schematic structural diagram of a network device according to another embodiment of the present invention.

It should be noted that the sending unit 1010 may be implemented by a transmitter, the receiving unit 1030 may be implemented by a receiver, and the processing unit 1020 may be implemented by a processor. FIG. 11 is a schematic structural diagram of a network device 1100 according to another embodiment of the present invention. As shown in FIG. 11, the network device 1100 includes a processor 1110, a receiver 1120, a transmitter 1130, and a memory 1140.

The memory 1140 may be configured to store code to be executed by the processor 1110, and the like. The receiver 1120 is configured to receive a signal under control of the processor 1110. The transmitter 1130 is configured to send a signal under control of the processor 1110.

It should be understood that the network device 1100 according to this embodiment of the present invention may correspond to the network device in the control channel resource indication method 200 according to the embodiment of the present invention and the network device 1000 according to the embodiment of the present invention, and the foregoing and other operations and/or functions of the units of the network device 1100 are for implementing corresponding procedures of the network device in the method 200 shown in FIG. 2. For brevity, details are not described herein again.

It should be noted that, in addition to including a data bus, a bus system in the foregoing embodiments may further include a power bus, a control bus, and a status signal bus.

The memory in the foregoing embodiments may include a volatile memory, for example, a random access memory (RAM). Alternatively, the memory may include a non-volatile memory, for example, a flash memory, a hard disk drive (HDD), or a solid-state drive (SSD). Alternatively, the memory may include a combination of the foregoing types of memories.

The processor in the foregoing embodiments may be a central processing unit (CPU), a network processor (NP), or a combination of a CPU and an NP. The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

A person of ordinary skill in the art may be aware that units and algorithm steps of examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of the present invention.

It may be clearly understood by a person skilled in the art that, for ease and brevity of description, for detailed working processes of the foregoing system, apparatus, and unit, reference may be made to corresponding processes in the foregoing method embodiments, and details are not described herein again.

In the several embodiments provided in the present invention, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements, to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions of the embodiments of the present invention essentially, or the part contributing to the prior art, or some of the technical solutions may be implemented in a form of a software product. The computer software product is stored in a storage medium, and includes one or more instructions for instructing a computer device (which may be a personal computer, a server, a network device, or the like) to perform all or some of the steps of the methods described in the embodiments of the present invention. The foregoing storage medium includes various media that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control channel resource indication method, the method comprising:
   receiving higher layer signaling, wherein the higher layer signaling is indicated by downlink control information carried in a common search space, wherein the higher layer signaling comprises an indication of a user equipment-dedicated search space; and
   determining frequency domain resource location information of the user equipment-dedicated search space based on the indication of the user equipment-dedicated search space in the higher layer signaling, wherein the frequency domain resource location information comprises a quantity of frequency domain resource units occupied by the user equipment-dedicated search space in a frequency domain and a location of the frequency domain resource units,
   wherein the common search space is located on a first time-frequency resource, wherein the user equipment-dedicated search space is located on a second time-frequency resource, wherein the second time-frequency resource partially overlaps with or does not overlap with the first time-frequency resource, and wherein:
   a control channel time-frequency resource comprises the common search space and the user equipment-dedicated search space;
   when a size of the control channel time-frequency resource is greater than a predefined threshold, a control channel aggregation level set is a first set;
   when a size of the control channel time-frequency resource is less than a predefined threshold, a control channel aggregation level set is a second set; and
   at least one aggregation level in the first set is higher than all aggregation levels in the second set.

2. The method according to claim 1, wherein the higher layer signaling further comprises at least one of: scrambling code sequence information of a reference signal in the user equipment-dedicated search space, or aggregation level information of the user equipment-dedicated search space.

3. The method according to claim 2, wherein the aggregation level information comprises a value of the aggregation level.

4. A control channel resource indication method, the method comprising:
   determining higher layer signaling, wherein the higher layer signaling is indicated by downlink control information carried in a common search space, wherein the higher layer signaling comprises an indication of a user equipment-dedicated search space, wherein the higher layer signaling is used to indicate frequency domain resource location information of a user equipment-dedicated search space, and wherein the frequency domain resource location information comprises a quantity of frequency domain resource units occupied by the user equipment-dedicated search space in a frequency domain and a location of the frequency domain resource units; and
   sending the higher layer signaling,
   wherein the common search space is located on a first time-frequency resource, wherein the user equipment-dedicated search space is located on a second time-frequency resource, and wherein the second time-frequency resource partially overlaps with or does not overlap with the first time-frequency resource, and wherein:
   a control channel time-frequency resource comprises the common search space and the user equipment-dedicated search space;
   when a size of the control channel time-frequency resource is greater than a predefined threshold, a control channel aggregation level set is a first set;
   when a size of the control channel time-frequency resource is less than a predefined threshold, a control channel aggregation level set is a second set; and
   at least one aggregation level in the first set is higher than all aggregation levels in the second set.

5. The method according to claim 4, wherein the higher layer signaling further comprises at least one of: scrambling code sequence information of a reference signal in the user equipment-dedicated search space, or aggregation level information of the user equipment-dedicated search space.

6. The method according to claim 5, wherein the aggregation level information comprises at least one of a quantity of elements comprised in a set of an aggregation level of the user equipment-dedicated search space or a value of the aggregation level.

7. A user equipment, the user equipment comprising:
a storage medium storing executable instructions; and
at least one processor;
wherein the executable instructions, when executed by the at least one processor, cause the user equipment to:
receive higher layer signaling, wherein the higher layer signaling is indicated by downlink control information carried in a common search space, wherein the higher layer signaling comprises an indication of a user equipment-dedicated search space; and
determine frequency domain resource location information of a user equipment-dedicated search space based on the indication of the user equipment-dedicated search space in the higher layer signaling, wherein the frequency domain resource location information comprises a quantity of frequency domain resource units occupied by the user equipment-dedicated search space in a frequency domain and a location of the frequency domain resource units,
wherein the common search space is located on a first time-frequency resource, wherein the user equipment-dedicated search space is located on a second time-frequency resource, and wherein the second time-frequency resource partially overlaps with or does not overlap with the first time-frequency resource, and wherein:
a control channel time-frequency resource comprises the common search space and the user equipment-dedicated search space;
when a size of the control channel time-frequency resource is greater than a predefined threshold, a control channel aggregation level set is a first set;
when a size of the control channel time-frequency resource is less than a predefined threshold, a control channel aggregation level set is a second set; and
at least one aggregation level in the first set is higher than all aggregation levels in the second set.

8. The user equipment according to claim 7, wherein the higher layer signaling further comprises at least one of: scrambling code sequence information of a reference signal in the user equipment-dedicated search space, or aggregation level information of the user equipment-dedicated search space.

9. The user equipment according to claim 8, wherein the aggregation level information comprises a value of the aggregation level.

10. A network device, the network device comprising:
a storage medium storing executable instructions; and
at least one processor;
wherein the executable instructions, when executed by the at least one processor, cause the network device to:
determine higher layer signaling, wherein the higher layer signaling is indicated by downlink control information carried in common search space, wherein the higher layer signaling comprises an indication of a user equipment-dedicated search space, wherein the higher layer signaling is used to indicate frequency domain resource location information of a user equipment-dedicated search space, and wherein the frequency domain resource location information comprises a quantity of frequency domain resource units occupied by the user equipment-dedicated search space in a frequency domain and a location of the frequency domain resource units; and
send the higher layer signaling,
wherein the common search space is located on a first time-frequency resource, wherein the user equipment-dedicated search space is located on a second time-frequency resource, and wherein the second time-frequency resource partially overlaps with or does not overlap with the first time-frequency resource, and wherein:
a control channel time-frequency resource comprises the common search space and the user equipment-dedicated search space;
when a size of the control channel time-frequency resource is greater than a predefined threshold, a control channel aggregation level set is a first set;
when a size of the control channel time-frequency resource is less than a predefined threshold, a control channel aggregation level set is a second set; and
at least one aggregation level in the first set is higher than all aggregation levels in the second set.

11. The network device according to claim 10, wherein the higher layer signaling further comprises at least one of: scrambling code sequence information of a reference signal in the user equipment-dedicated search space, or aggregation level information of the user equipment-dedicated search space.

12. The network device according to claim 11, wherein the aggregation level information comprises a value of the aggregation level.

* * * * *